(12) United States Patent
Matsuura

(10) Patent No.: US 12,056,973 B2
(45) Date of Patent: Aug. 6, 2024

(54) INFORMATION PROCESSING APPARATUS, READING SYSTEM, INFORMATION PROCESSING METHOD, AND NON-TRANSITORY COMPUTER READABLE MEDIUM STORING PROGRAM

(71) Applicant: NEC Platforms, Ltd., Kawasaki (JP)

(72) Inventor: Hideki Matsuura, Tokyo (JP)

(73) Assignee: NEC Platforms, Ltd., Kanagawa (JP)

( * ) Notice: Subject to any disclaimer, the term of this patent is extended or adjusted under 35 U.S.C. 154(b) by 259 days.

(21) Appl. No.: 17/634,374

(22) PCT Filed: Aug. 3, 2020

(86) PCT No.: PCT/JP2020/029645
§ 371 (c)(1),
(2) Date: Feb. 10, 2022

(87) PCT Pub. No.: WO2021/033524
PCT Pub. Date: Feb. 25, 2021

(65) Prior Publication Data
US 2022/0327880 A1 Oct. 13, 2022

(30) Foreign Application Priority Data
Aug. 21, 2019 (JP) .................. 2019-151546

(51) Int. Cl.
*G07C 9/29* (2020.01)
*G06K 7/10* (2006.01)

(52) U.S. Cl.
CPC .......... *G07C 9/29* (2020.01); *G06K 7/10366* (2013.01)

(58) Field of Classification Search
CPC ........ G07C 9/29; G07C 9/00; G06K 7/10366; G06K 7/10009; G06Q 10/063;
(Continued)

(56) References Cited

U.S. PATENT DOCUMENTS 8,477,032 B2 * 7/2013 Bergman ............. G08B 13/248
340/568.1
11,587,147 B2 * 2/2023 Haidacher ............. G06Q 30/00
(Continued)

FOREIGN PATENT DOCUMENTS

| CN | 101515341 A | 8/2009 |
| CN | 103975370 A | 8/2014 |

(Continued)

OTHER PUBLICATIONS

International Search Report for PCT Application No. PCT/JP2020/029645, mailed on Oct. 13, 2020.
(Continued)

*Primary Examiner* — Nam V Nguyen
(74) *Attorney, Agent, or Firm* — Sughrue Mion, PLLC

(57) ABSTRACT

The present disclosure provides an information processing apparatus, a reading system, an information processing method, and a program that are capable of appropriately managing the carrying-in or the carrying-out of an article. An information processing apparatus (1) includes a flow line specification unit (2) that specifies a flow line of a movement of an object in a predetermined first area of a gate on an entrance side of the gate, and a reading control unit (3) that performs control so that reading processing of an RFID tag near the gate is started when the specified flow line corresponds to a predetermined pattern.

6 Claims, 18 Drawing Sheets

(58) Field of Classification Search
CPC ...... G06Q 10/087; G06Q 30/06; G06Q 50/28; B65G 1/137
USPC ......................................... 340/5.65, 5.7, 6.1
See application file for complete search history.

(56) References Cited

U.S. PATENT DOCUMENTS

2012/0044074 A1* 2/2012 Mulla ................ G08B 13/2448
340/572.1
2012/0307051 A1* 12/2012 Welter ............... G08B 13/2482
340/572.1
2013/0255154 A1* 10/2013 Kanki ..................... B66B 13/26
49/25

FOREIGN PATENT DOCUMENTS

| | | |
|---|---|---|
| CN | 105139046 A | 12/2015 |
| CN | 107195057 A | 9/2017 |
| JP | 2001-074855 A | 3/2001 |
| JP | 2010-210333 A | 9/2010 |
| JP | 2010-218280 A | 9/2010 |
| WO | 2012/073821 A1 | 6/2012 |

OTHER PUBLICATIONS

JP Ofice Action for JP Application No. 2019-151546, mailed on Oct. 6, 2020 with English Translation.
CN Office Action for CN Application No. 202080058566.3, mailed on Jul. 25, 2023 with English Translation.

* cited by examiner

INFORMATION PROCESSING APPARATUS, READING SYSTEM, INFORMATION PROCESSING METHOD, AND NON-TRANSITORY COMPUTER READABLE MEDIUM STORING PROGRAM

This application is a National Stage Entry of PCT/JP2020/029645 filed on Aug. 3, 2020, which claims priority from Japanese Patent Application 2019-151546 filed on Aug. 21, 2019, the contents of all of which are incorporated herein by reference, in their entirety.

TECHNICAL FIELD

The present invention relates to an information processing apparatus, a reading system, an information processing method, and a program.

BACKGROUND ART

In recent years, various technologies using a radio frequency identifier (RFID) have been proposed. For example, Patent Literature 1 discloses an entrance/exit management system for managing people who enter and leave a room using an RFID. In this entrance/exit management system, when a person who enters and leaves a room is detected by a sensor, radio wave transmission by a reader/writer is started, and when a person who enters and leaves a room can no longer be detected by the sensor, the radio wave transmission by the reader/writer is stopped.

CITATION LIST

Patent Literature

Patent Literature 1: Japanese Unexamined Patent Application Publication No. 2010-210333

SUMMARY OF INVENTION

Technical Problem

According to the technology disclosed in Patent Literature 1, the radio wave transmission by the reader/writer is controlled in accordance with a result of detection as to whether or not a person is present in a predetermined area. However, when the reading of an RFID tag is controlled in accordance with whether or not a person is present in a predetermined area, an unintended reading may be performed.

Therefore, the following problem may occur when an RFID tag attached to an article is read at a carry-in entrance or a carry-out entrance to thereby manage the article as to whether or not it has been carried in or out. That is, when a carrier approaches the carry-in entrance or the carry-out entrance, the RFID tag is read even though the article has not been actually carried in or out, and as a result, the article may be erroneously processed in accordance with the assumption that the article has been carried in or out.

Therefore, one of the objects that are achieved by example embodiments disclosed herein is to provide an information processing apparatus, a reading system, an information processing method, and a program that are capable of appropriately managing the carrying-in or the carrying-out of an article.

Solution to Problem

An information processing apparatus according to a first example aspect includes:

flow line specification means for specifying a flow line of a movement of an object in a predetermined first area of a gate on an entrance side of the gate; and reading control means for performing control so that reading processing of an RFID tag near the gate is started when the specified flow line corresponds to a predetermined pattern.

A reading system according to a second example aspect includes:

a sensor configured to detect an object;

a reading apparatus configured to communicate with an RFID tag and thereby read information stored in the RFID tag; and an information processing apparatus, in which the information processing apparatus includes:

flow line specification means for specifying a flow line of a movement of an object in a predetermined first area of a gate on an entrance side of the gate based on a result of detection by the sensor; and reading control means for performing control so that reading processing of an RFID tag near the gate performed by the reading apparatus is started when the specified flow line corresponds to a predetermined pattern.

An information processing method according to a third example aspect includes:

specifying a flow line of a movement of an object in a predetermined first area of a gate on an entrance side of the gate; and performing control so that reading processing of an RFID tag near the gate is started when the specified flow line corresponds to a predetermined pattern.

A program according to a fourth example aspect causes a computer to execute:

a flow line specification step of specifying a flow line of a movement of an object in a predetermined first area of a gate on an entrance side of the gate; and a reading control step of performing control so that reading processing of an RFID tag near the gate is started when the specified flow line corresponds to a predetermined pattern.

Advantageous Effects of Invention

According to the above-described example aspects, it is possible to provide an information processing apparatus, a reading system, an information processing method, and a program that are capable of appropriately managing the carrying-in or the carrying-out of an article.

DESCRIPTION OF EMBODIMENTS

Outline of Example Embodiment

Figure 1:
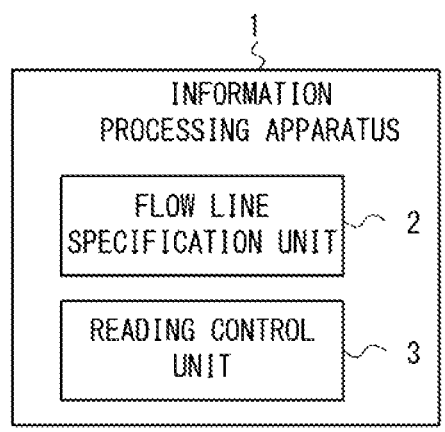
FIG. 1 is a block diagram showing an example of a configuration of an information processing apparatus according to an outline of an example embodiment.

Prior to describing an example embodiment in detail, an outline of the example embodiment will be given. FIG. 1 is a block diagram showing an example of a configuration of an information processing apparatus 1 according to the outline of the example embodiment. As shown in FIG. 1, the information processing apparatus 1 includes a flow line specification unit 2 and a reading control unit 3.

The flow line specification unit 2 specifies a flow line of a movement (i.e., a moving path) of an object in a predetermined area of a gate on an entrance side thereof.

The reading control unit 3 performs control so that reading processing of an RFID tag near the gate is started when the flow line specified by the flow line specification unit 2 corresponds to a predetermined pattern.

According to the above configuration, even if an object (e.g., a person) approaches the vicinity of the gate, the reading processing of a RFID tag is not started when the flow line of the movement of the object does not correspond to a predetermined pattern. Therefore, in the case of a movement where an article is not carried in or out, the reading can be prevented. Therefore, it is possible to appropriately manage the carrying-in or the carrying-out of an article.

Note that, in the present disclosure, a gate is a partition of a space set for managing the carrying-in or the carrying-out of an article, and may not necessarily be a physical structure.

The gate may be referred to as a conveyance entrance, or a carry-in entrance or a carry-out entrance. For example, in a case in which the carrying-in of an article into a certain place is managed, when the article is moved from the entrance side of a gate (a carry-in entrance) to the exit side thereof, it means that the article has been carried in. Similarly, in a case in which the carrying-out of an article from a certain place is managed, when the article is moved from the entrance side of a gate (a carry-out entrance) to the exit side thereof, it means that the article has been carried out. Note that, specifically, the carrying-in or the carrying-out of an article may be, for example, a carrying-in or a carrying-out of an article in a warehouse or a store (putting an article into or taking an article out of a storage). Further, when a gate is installed in a store that sells merchandise, management of the passage of the merchandise through the gate (i.e., management of the carrying-out of the merchandise) means specification of the merchandise to be purchased. As described above, the information processing apparatus 1 can be used to manage the carrying-in or the carrying-out of an article in various types of environments.

First Example Embodiment

Next, details of the example embodiment will be described.

Figure 2:
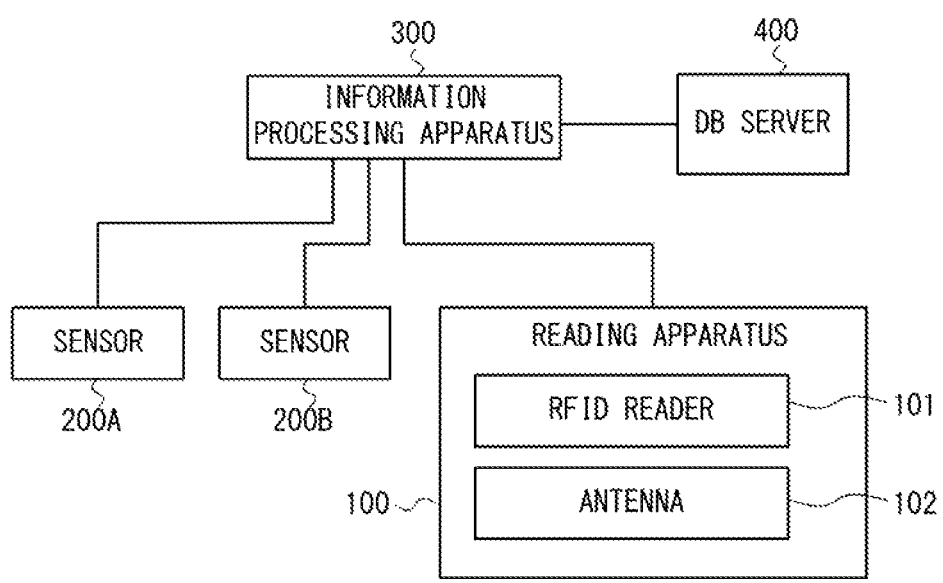
FIG. 2 is a block diagram showing an example of a configuration of a reading system according to the example embodiment.
Figure 3:
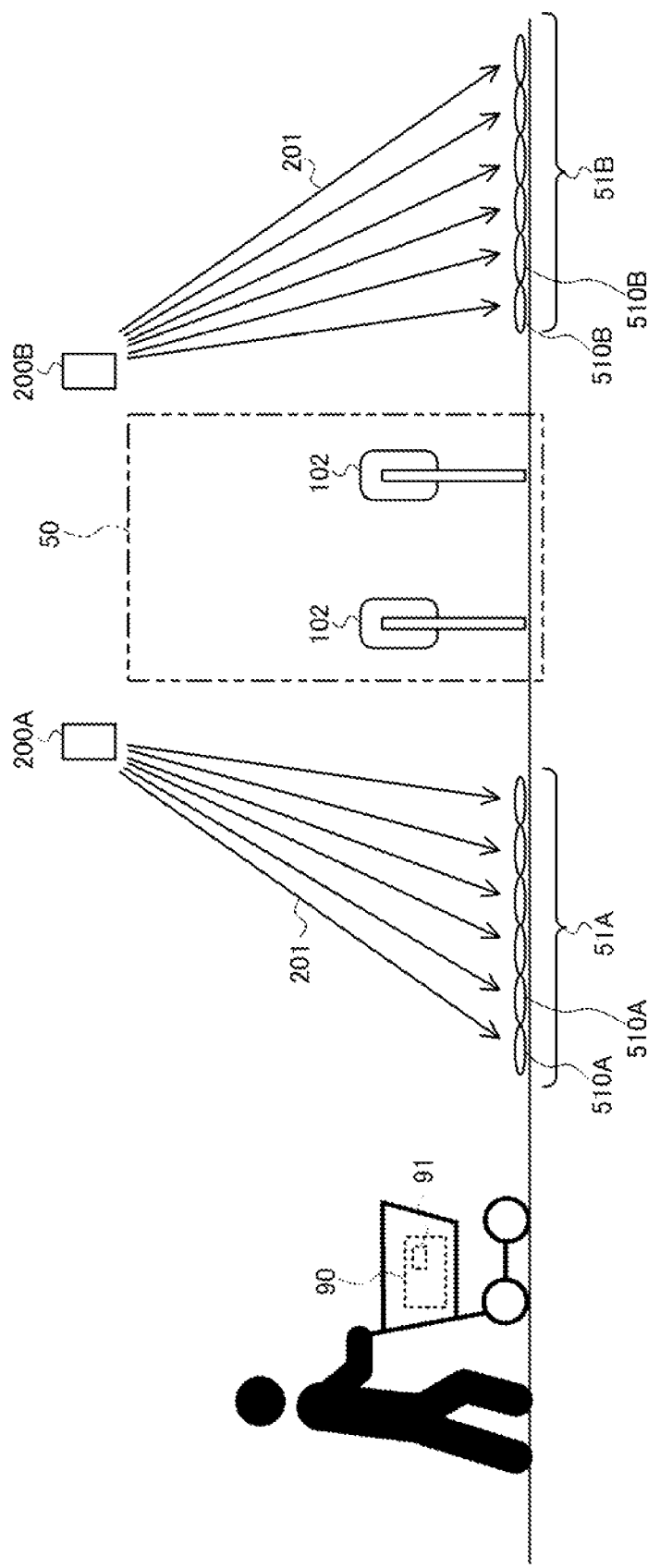
FIG. 3 is a schematic diagram showing the periphery of a gate viewed from the side thereof.
Figure 4:
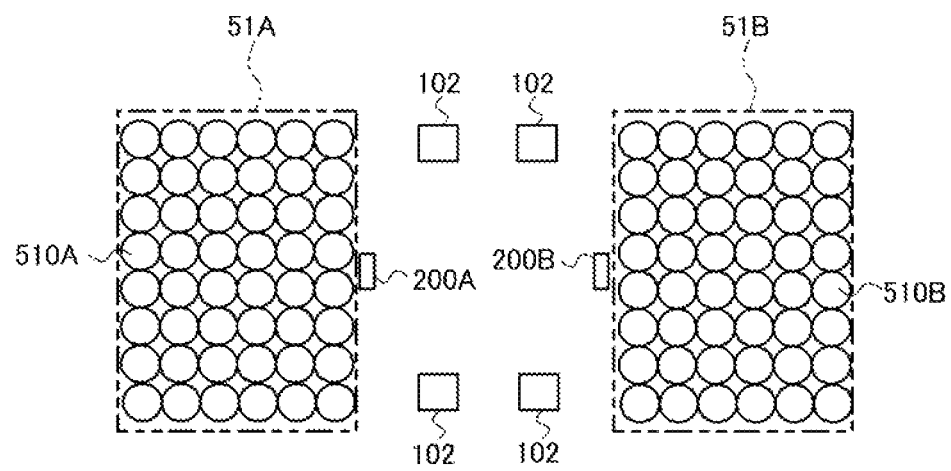
FIG. 4 is a schematic diagram showing a detection area of the sensor and showing the gate viewed from above.

FIG. 2 is a block diagram showing an example of a configuration of a reading system 10 according to the example embodiment. Further, FIG. 3 is a schematic diagram showing the periphery of a gate 50 viewed from the side thereof. Further, FIG. 4 is a schematic diagram showing a detection area of each of a sensor 200A and a sensor 200B and showing the gate viewed from above. As shown in FIG. 2, the reading system 10 includes a reading apparatus 100, the sensors 200A and 200B, an information processing apparatus 300, and a DB server 400. The reading system 10 is a system that manages the conveyance (specifically, the carrying-in or the carrying-out) of an article 90 by managing the passage of the article 90 through the gate. The reading system 10 specifies the article 90 that has passed through the gate 50 by reading an RFID tag 91 attached to the article 90 to be managed. By doing so, the reading system 10 manages each article 90 as to whether or not it has been conveyed.

Note that, in the description of this example embodiment, although an entrance and an exit are defined for the gate 50 for the sake of convenience of description, the reading system 10 may manage the conveyance of an article through the gate in both the exit and entrance directions instead of managing the conveyance of an article through the gate in one direction only.

The reading apparatus 100 is an apparatus for communicating with the RFID tag 91 and thereby reading information stored in the RFID tag 91 attached to the article 90 for which the carrying-in or the carrying-out is managed, and includes an RFID reader 101 and an antenna 102. The reading apparatus 100 is connected to the information processing apparatus 300 wirelessly or by wire so that they can communicate with each other. Note that, for example, identification information for uniquely specifying the article 90 is stored in advance in the RFID tag 91, and the reading apparatus 100 reads the information stored in the RFID tag 91.

The RFID reader 101 is a control circuit that communicates with the RFID tag 91 through the antenna 102 in accordance with a predetermined communication protocol and reads information stored in the RFID tag 91. The RFID reader 101 outputs the information read from the RFID tag 91 to the information processing apparatus 300.

The antenna 102, which is installed at a position where it can transmit and receive radio waves to and from the RFID tag 91 passing through the gate, transmits radio waves to the RFID tag 91 and receives radio waves transmitted by the RFID tag 91. In this example embodiment, a total of four antennas 102, two at each side of the gate 50, are installed at the gate 50. However, the number of antennas 102 is not limited and may be one or more. Further, regarding the antennas 102, an antenna for transmission and an antenna for reception may be separately provided.

Each of the sensors 200A and 200B is a sensor that detects an object in a predetermined area. The sensors 200A and 200B are connected to the information processing apparatus 300 wirelessly or by wire so that they can communicate with each other. The sensors 200A and 200B detect various type of objects that have entered a predetermined area, such as a person, an Automated Guided Vehicle (AGV), and an article. The sensor 200A is a sensor that detects an object in a predetermined detection area 51A (also referred to as a first area) of the gate 50 on the entrance side thereof (see FIGS. 3 and 4). Further, the sensor 200B is a sensor that detects an object in a predetermined detection area 51B (also referred to as a second area) of the gate 50 on the exit side thereof (see FIGS. 3 and 4). In this example embodiment, the sensor 200A is provided near the upper part of the gate 50 on the entrance side thereof, and the sensor 200B is provided near the upper part of the gate 50 on the exit side thereof.

In this example embodiment, the sensors 200A and 200B are sensors that detect objects by emitting light beams 201 to respective partial areas 510A and 510B obtained by dividing the respective predetermined detection areas 51A and 51B into a lattice shape and receiving reflected lights of the light beams 201. Note that the light beam 201 is, for example, an infrared ray. However, the light beam 201 is not limited thereto. The sensors 200A and 200B detect objects by detecting whether or not the light beams 201 emitted to the respective partial areas 510A and 510B are blocked by objects. The sensor 200A emits the light beam to each of the partial areas 510A (see FIGS. 3 and 4) obtained by dividing the detection area 51A located on the entrance side of the gate 50 into a lattice shape, and receives a reflected light of each of the emitted light beams. Similarly, the sensor 200B emits the light beam to each of the partial areas 510B (see FIGS. 3 and 4) obtained by dividing the detection area 51B located on the exit side of the gate 50 into a lattice shape, and receives a reflected light of each of the emitted light beams.

The sensors 200A and 200B detect the presence of an object by the difference between a reception state of the reflected light in a case where the object is present and a reception state of the reflected light in a case where the object is not present. This difference between the reception states of the reflected lights may be a difference between the lengths of time for which lights are reflected or a difference between the amounts of lights received.

As described above, the sensors 200A and 200B emit light beams to the respective partial areas 510A and 510B. Therefore, when the total number of the partial areas 510A or 510B in the corresponding detection area 51A or 51B is n, the sensors 200A and 200B obtain n detection results as a result of the detection of the object. When the object moves within the detection area 51A or 51B, the range of the partial area 510A or 510B from which the detection result indicating that the object is present is obtained changes with time. Further, the transition of the range of the partial area 510A or 510B from which the detection result indicating that the object is present is obtained corresponds to the moving direction of the object. Therefore, by analyzing the time series data of the n detection results of the sensors 200A and 200B, it is possible to specify the moving direction of the object in the detection area 51A or 51B. That is, it is possible to specify the flow line. In this example embodiment, the flow line is specified by the information processing apparatus 300. Therefore, each of the sensors 200A and 200B continuously transmits the above-described n detection results to the information processing apparatus 300. In this way, the information processing apparatus 300 acquires the time series data of the detection results of the respective partial areas 510A and 510B by the respective sensors 200A and 200B.

Note that, in this example embodiment, although the sensor 200A for the entrance and the sensor 200B for the exit are used for detecting an object in each of the respective detection areas 51A and 51B, only one sensor for detecting an object in both of the detection areas 51A and 51B may instead be used.

Further, as described above, in this example embodiment, although sensors that emit the light beams 201 to the respective partial areas 510A and 510B are used for detecting an object, any other sensor capable of detecting an object for specifying the flow line may instead be used. For example, a camera that captures movements of objects in the detection areas 51A and 51B may be used.

The DB server 400 is a database server that stores information about each article 90. For example, the DB server 400 manages various types of information about the article 90, including at least information indicating a conveyance state of the article 90 (hereinafter referred to as conveyance information) by associating it with identification information of the article 90. The conveyance information is information indicating whether or not an article has been conveyed. In this example embodiment, the conveyance information stored in the DB server 400 is updated by the information processing apparatus 300 based on the information read from the RFID tag 91 that has passed through the gate 50.

The information processing apparatus 300 is an apparatus that controls the reading apparatus 100 based on results of detection by the sensors 200A and 200B, and manages each article as to whether or not it has been conveyed. The information processing apparatus 300 is connected to the reading apparatus 100, the sensors 200A and 200B, and the DB server 400 so that they can communicate with each other. Note that, in the configuration shown in FIG. 2, although the information processing apparatus 300 communicates with the DB server 400 and thereby updates the conveyance information of the article 90 managed by a database, the information processing apparatus 300 may include such a database. That is, the reading system 10 does not necessarily have to include the DB server 400.

Figure 5:
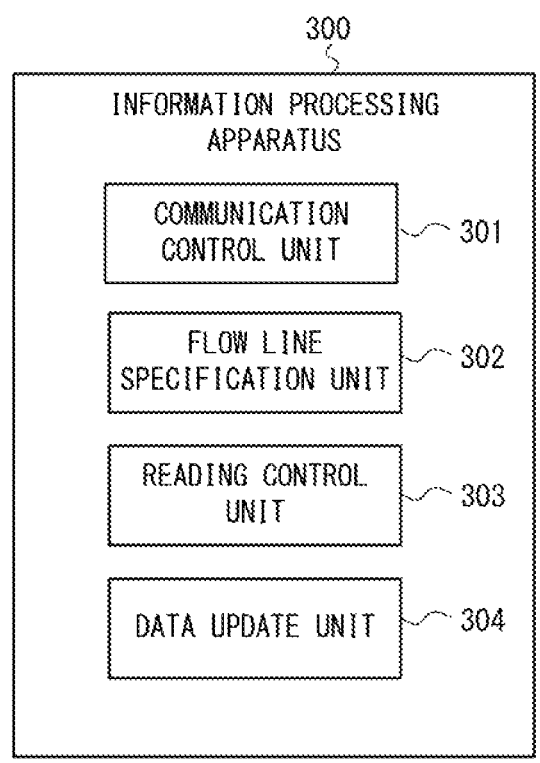
FIG. 5 is a block diagram showing an example of a functional configuration of the information processing apparatus according to the example embodiment.

FIG. 5 is a block diagram showing an example of a functional configuration of the information processing apparatus 300. As shown in FIG. 5, the information processing apparatus 300 includes a communication control unit 301, a flow line specification unit 302, a reading control unit 303, and a data update unit 304.

The communication control unit 301 communicates with another apparatus and transmits and receives information to and from the other apparatus. Specifically, the communication control unit 301 acquires information stored in the RFID tag 91 from the RFID reader 101 of the reading apparatus 100. Further, the communication control unit 301 acquires detection results from the sensors 200A and 200B.

Further, the communication control unit 301 transmits and receives information about the article 90 to and from the DB server 400.

The flow line specification unit 302 specifies a flow line of a movement of an object in the predetermined detection area 51A of the gate 50 on the entrance side thereof based on a result of detection by the sensor 200A. Further, the flow line specification unit 302 specifies a flow line of a movement of an object in the predetermined detection area 51B of the gate 50 on the exit side thereof. In this example embodiment, the flow line specification unit 302 specifies a flow line of an object by analyzing, using the time series data of the detection result obtained from the sensors 200A and 200B, a temporal transition of the range of the partial areas 510A and 510B from which the detection result indicating that the object is present is obtained. Specifically, the flow line specification unit 302 specifies a moving direction (a moving path) and a moving speed of the object as a flow line. Note that when a camera is used as a sensor for detecting an object, the flow line specification unit 302 specifies the flow line of the object by analyzing an image captured by the camera.

The reading control unit 303 determines whether or not the flow line specified by the flow line specification unit 302 corresponds to a pattern predetermined as a condition for starting reading processing of the RFID tag 91. More specifically, when the specified flow line for the movement of the object in the detection area 51A corresponds to this predetermined pattern, the reading control unit 303 performs control so that the reading processing of the RFID tag 91 near the gate 50 is started. To be specific, the reading control unit 303 instructs the reading apparatus 100 to start the reading processing of the RFID tag 91. In this way, the reading apparatus 100 starts the reading processing, and when the RFID tag 91 that can communicate with the reading apparatus 100 is present, the reading apparatus 100 reads the information of the RFID tag 91.

Specifically, in this example embodiment, the pattern predetermined as a condition for starting reading processing of the RFID tag 91 is a movement pattern of an object in which the object approaches a predetermined position near the entrance of the gate 50. That is, the reading control unit 303 performs control so that the reading processing of the RFID tag 91 is started when the specified flow line indicates a movement of an object approaching a predetermined position near the entrance of the gate 50. Note that, specifically, the predetermined position near the entrance is, for example, an edge of the detection area 51A on the gate 50 side.

Figure 6:
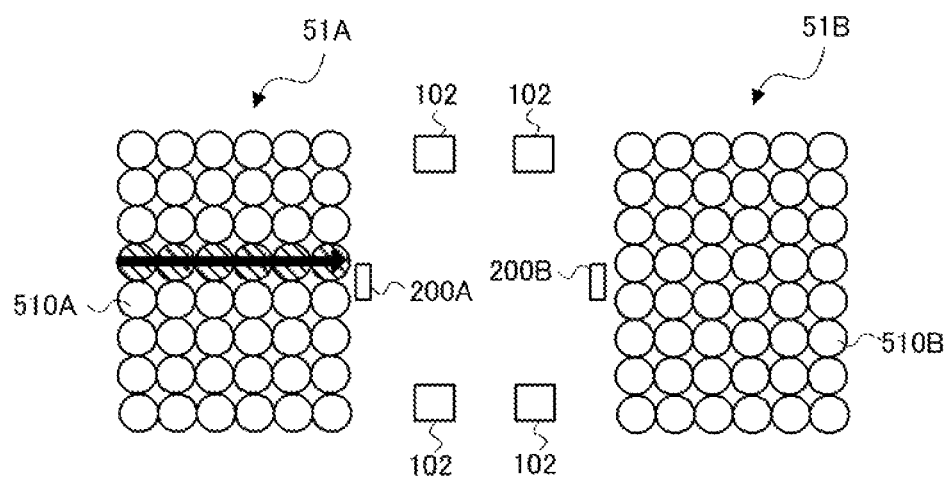
FIG. 6 is a schematic diagram showing an example of a flow line that satisfies a condition for starting reading processing of a RFID tag.
Figure 7:
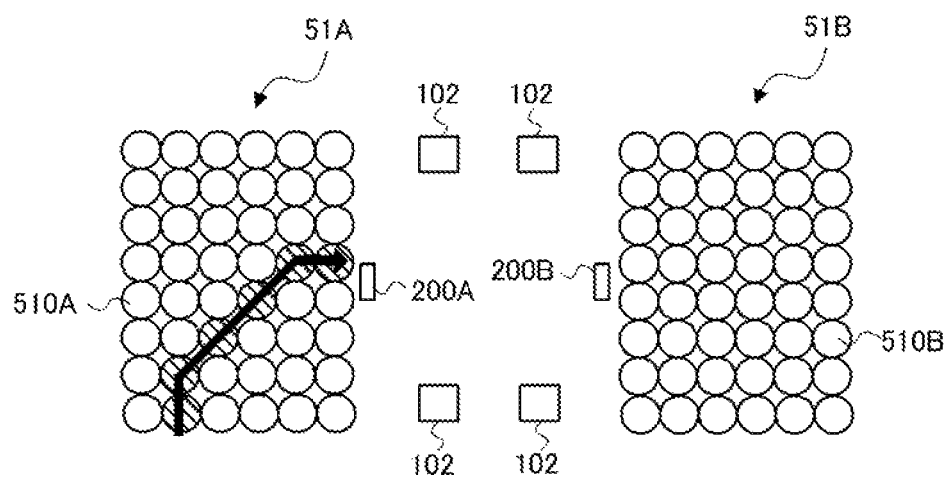
FIG. 7 is a schematic diagram showing an example of a flow line that satisfies the condition for starting the reading processing of the RFID tag.

FIGS. 6 and 7 are schematic diagrams each showing an example of a flow line that satisfies a condition for starting reading processing of the RFID tag 91. Note that, in FIGS. 6 and 7, the hatched partial areas 510A indicate the partial areas 510A in which the presence of an object is detected, and an arrow indicates the flow line. As shown in FIGS. 6 and 7, when the specified flow line of the object indicates a movement of an object approaching a predetermined position (specifically, the edge of the detection area 51A on the gate 50 side) near the entrance of the gate 50, the reading control unit 303 performs control so that the reading processing is started.

Figure 8:
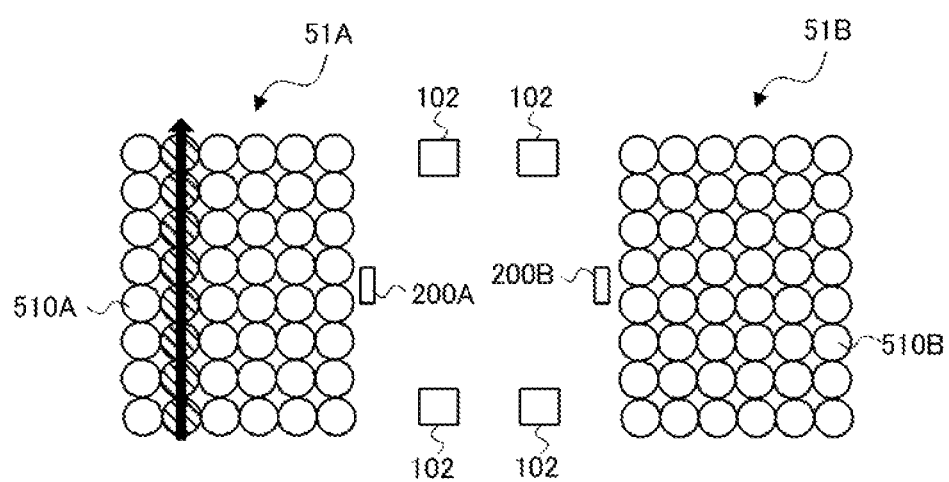
FIG. 8 is a schematic diagram showing an example of a flow line that does not satisfy the condition for starting the reading processing of the RFID tag.
Figure 9:
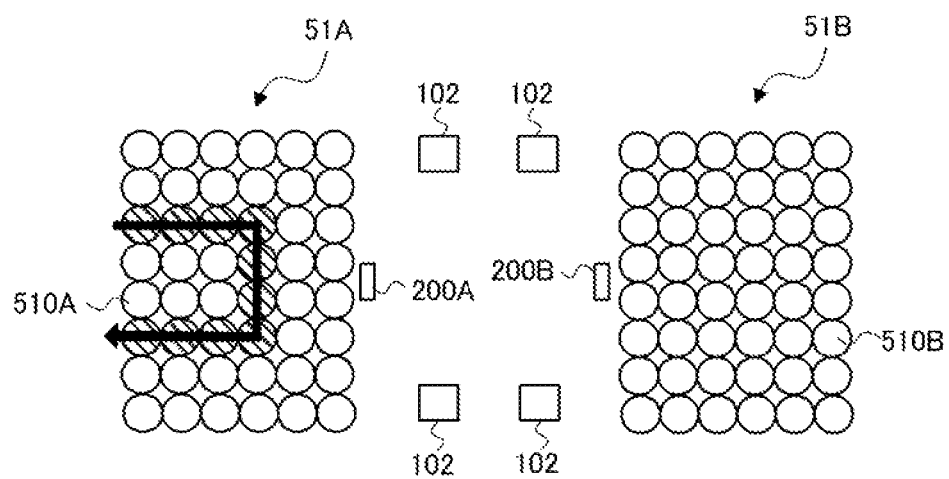
FIG. 9 is a schematic diagram showing an example of a flow line that does not satisfy the condition for starting the reading processing of the RFID tag.

On the other hand, FIGS. 8 and 9 are schematic diagrams each showing an example of a flow line that does not satisfy the condition for starting the reading processing of the RFID tag 91. Note that, in FIGS. 8 and 9, the hatched partial areas 510A indicate the partial areas 510A in which the presence of an object is detected, and an arrow indicates the flow line. FIG. 8 shows an example of a flow line corresponding to a movement of an object crossing the periphery of the gate 50. Further, FIG. 9 shows an example of a flow line corresponding to a movement of an object turning back after once approaching the gate 50.

The reading control unit 303 performs control so that the reading processing is ended when the data update unit 304, which will be described later, determines that the article 90 specified by the identification information read from the RFID tag 91 has passed through the gate 50. Specifically, the reading control unit 303 instructs the reading apparatus 100 to end the reading processing of the RFID tag 91. Further, the reading control unit 303 control so that the reading processing is ended when it is determined that the article 90 has not passed through the gate 50.

The data update unit 304 updates conveyance information about the article 90 that has passed through the gate 50. Therefore, the data update unit 304 determines whether or not the article 90 specified by the identification information read from the RFID tag 91 has passed through the gate 50. The data update unit 304 determines whether or not the article 90 has passed through the gate 50 by determining whether or not the flow line specified by the flow line specification unit 302 corresponds to a pattern predetermined as a condition for determining that the article has passed through the gate. More specifically, when the specified flow line for the movement of the object in the detection area 51B corresponds to this predetermined pattern, the data update unit 304 determines that the article 90 specified by the identification information read from the RFID tag 91 has passed through the gate 50.

Note that the data update unit 304 is also referred to as a passage determination unit.

Specifically, in this example embodiment, the pattern predetermined as the condition for determining that the article has passed through the gate is a movement pattern of an object in which the object moves away from the vicinity of the exit of the gate 50. That is, the data update unit 304 determines that the article 90 specified by the identification information read from the RFID tag 91 has passed through the gate 50 when the specified flow line indicates a movement of an object moving away from the vicinity of the exit of the gate 50. By the above, it is possible to more reliably determine that the article 90 has passed through the gate.

Figure 10:
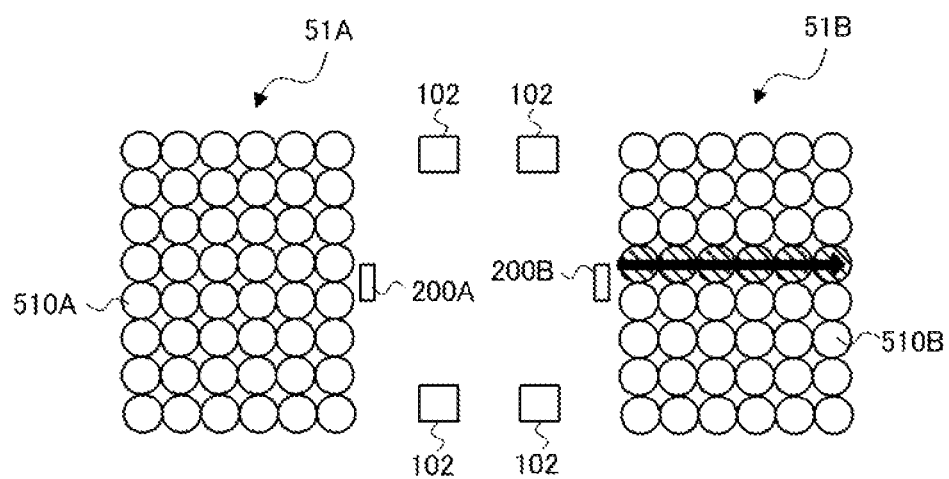
FIG. 10 is a schematic diagram showing an example of a flow line that satisfies a condition for determining that an article has passed through the gate.
Figure 11:
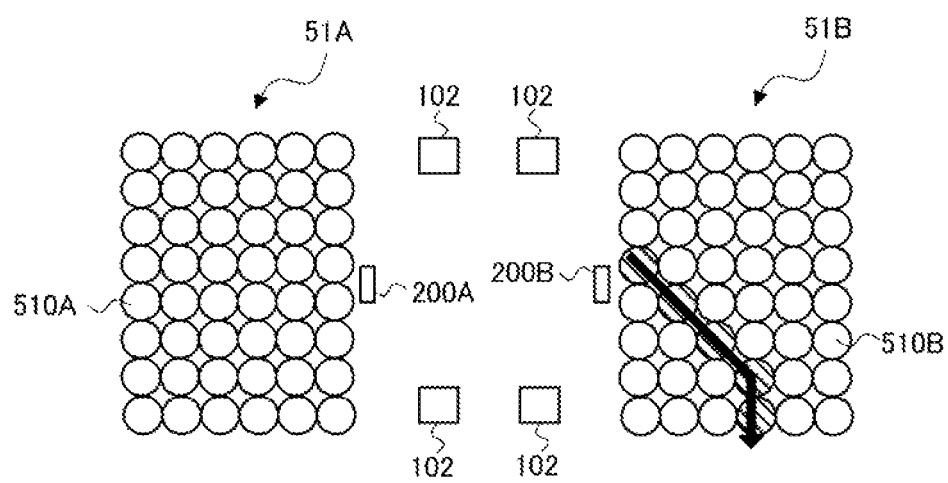
FIG. 11 is a schematic diagram showing an example of a flow line that satisfies the condition for determining that the article has passed through the gate.

FIGS. 10 and 11 are schematic diagrams each showing an example of a flow line that satisfies a condition for determining that the article has passed through the gate. Note that, in FIGS. 10 and 11, the hatched partial areas 510B indicate the partial areas 510B in which the presence of an object is detected, and an arrow indicates the flow line. As shown in FIGS. 10 and 11, when the specified flow line of the object indicates a movement of an object moving away from the vicinity of the exit of the gate 50, the data update unit 304 determines that the article 90 has passed through the gate 50.

Figure 12:
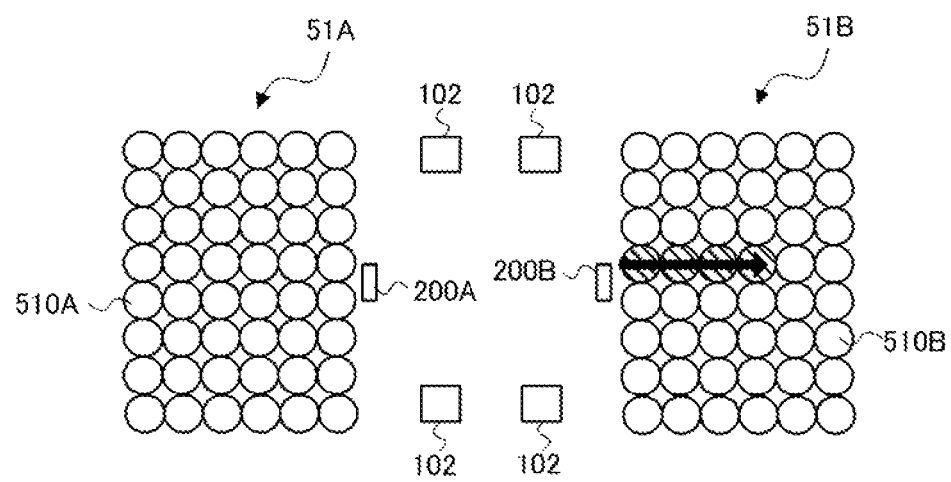
FIG. 12 is a schematic diagram showing an example of a flow line that satisfies the condition for determining that the article has passed through the gate.

Note that, as shown in FIGS. 10 and 11, the pattern predetermined for a condition for determining that the article has passed through the gate may be a movement pattern of an object in which the object moves from the vicinity of the exit of the gate 50 to the outside of the detection area 51B, or may be a movement pattern of an object in which the object does not move out of the detection area 51B. That is, the pattern predetermined for a condition for determining that the article has passed through the gate may be a movement pattern (see FIG. 12) of an object in which the object moves away from the vicinity of the exit of the gate 50 to a predetermined position in the detection area 51B. In this case, it is determined that the article 90 has passed through the gate 50 even when it has not moved outside the detection area 51B. As described above, when it is determined that the article 90 has passed through the gate 50, the reading processing is ended. Therefore, it is possible to end the reading processing even when the article has not moved outside the detection area 51B, and thus it is possible to prevent the reading processing from uselessly continuing.

Incidentally, it is conceivable that, for example, a carrier turns back without passing through the gate 50 or after once passing through the gate even when the flow line that satisfies the condition for starting the reading processing is obtained. In this case, it is not preferable that conveyance information be updated in accordance with the assumption that the article 90 specified by the identification information read from the RFID tag 91 has passed through the gate 50. Therefore, when the flow line specified after the start of the reading processing indicates a movement of an object moving away from the vicinity of the entrance of the gate 50 on the entrance side of the gate 50, the data update unit 304 determines that the article 90 has not passed through the gate 50. Specifically, when the flow line for the movement of the object after the start of the reading processing but before the end of the reading processing indicates a movement of an object moving away from the vicinity of the entrance of the gate 50, the data update unit 304 determines that the article 90 has not passed through the gate 50 as a final determination.

Figure 13:
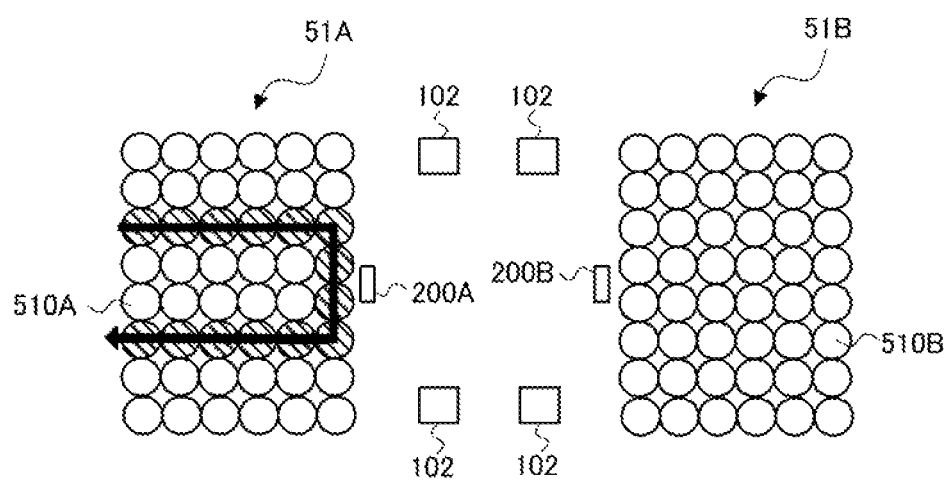
FIG. 13 is a schematic diagram showing an example of a flow line by which it is determined that an article has not passed through the gate.
Figure 14:
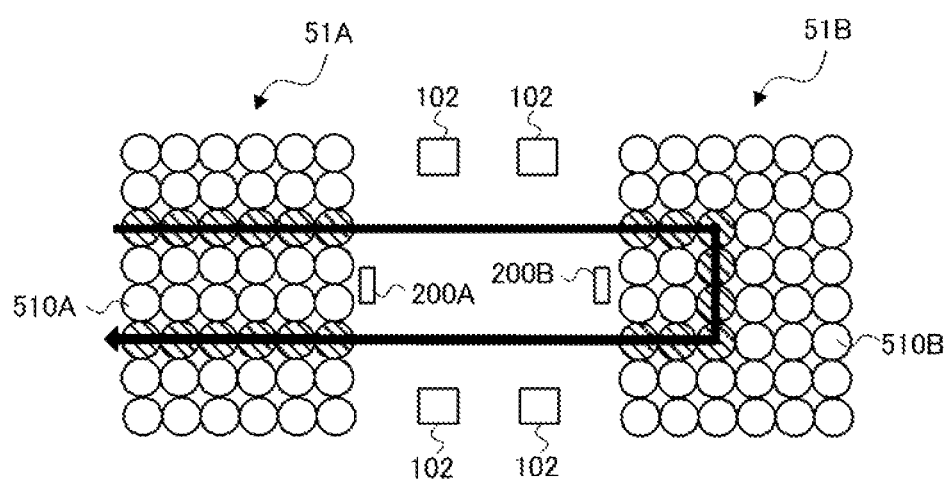
FIG. 14 is a schematic diagram showing an example of a flow line by which it is determined that the article has not passed through the gate.

FIGS. 13 and 14 are schematic diagrams each showing an example of a flow line by which it is determined that the article 90 has not passed through the gate 50. Note that, in FIGS. 13 and 14, the hatched partial areas 510A and 510B indicate the partial areas 510A and 510B in which the presence of an object is detected, and an arrow indicates the flow line. FIG. 13 shows an example of the flow line corresponding to a movement of an object turning back without passing through the gate 50. Further, FIG. 14 shows an example of the flow line corresponding to a movement of an object that has once passed through the gate 50 but turns back. As shown in FIGS. 13 and 14, when the flow line indicates a movement of an object moving away from the vicinity of the entrance of the gate 50 on the entrance side of the gate 50 after the start of the reading processing, the data update unit 304 determines that the article 90 has not passed through the gate 50. By the above, it is possible to prevent conveyance information from being updated to erroneous information.

Here, assume a case in which the article 90 is left near the entrance of the gate 50. In this case, like in the above case, it is not preferable that conveyance information be updated in accordance with the assumption that the article 90 specified by the identification information read from the RFID tag 91 has passed through the gate 50. Therefore, when the flow line specified after the start of the reading processing indicates that the object is staying near the entrance of the gate 50, the data update unit 304 determines that the article 90 has not passed through the gate 50. More specifically, when the flow line for the movement of the object after the start of the reading processing but before the end of the reading processing indicates that the object is staying near the entrance of the gate 50, the data update unit 304 determines that the article 90 has not passed through the gate 50 as a final determination. By the above, it is possible to prevent conveyance information from being updated to erroneous information.

Further, in a case in which the data update unit 304 determines that the article has not passed through the gate 50 since the flow line indicates that the object is staying near the entrance of the gate 50, the data update unit 304 further performs the following processing. That is, in this case, even when the identification information is read from the RFID tag 91 of the staying article 90 after the next reading processing is started, the data update unit 304 determines that the staying article 90 has not passed through the gate 50. When the article 90 continues to be left near the entrance of the gate 50, each time another article 90 passes through the gate 50, the article 90 that is left may be read and the conveyance information of the article 90 that is left may be updated. Therefore, as described above, even when the identification information is read again from the RFID tag 91 of the article 90 that is left after the start of the next reading processing, the data update unit 304 determines that the article 90 (i.e., the article 90 that is left) specified by the identification information has not passed through the gate 50. Specifically, the data update unit 304 stores the identification information of the article 90 that is left, for example, as identification information of the article for which conveyance information is not to be updated. By the above, it is possible to prevent conveyance information from being updated to erroneous information.

After the reading processing is ended, the data update unit 304 updates the conveyance information of the article 90 for which it is determined that it has passed through the gate 50 to conveyance information indicating that the article 90 has passed through the gate 50.

Figure 15:
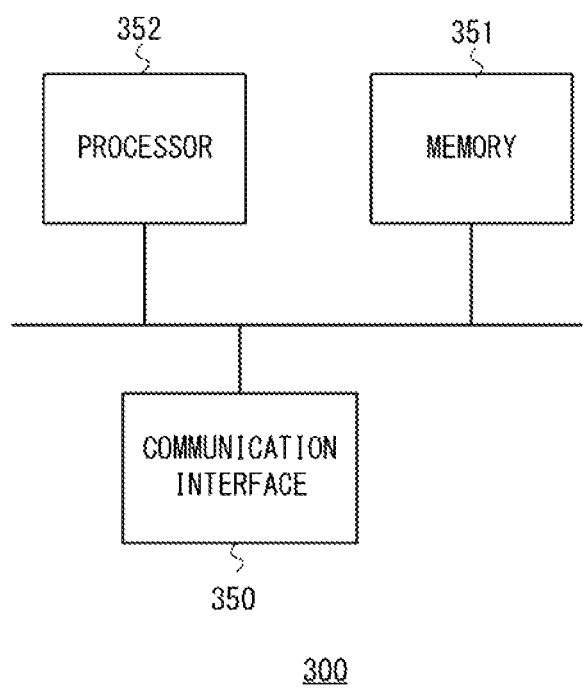
FIG. 15 is a schematic diagram showing an example of a hardware configuration of the information processing apparatus according to the example embodiment.

Next, a hardware configuration of the information processing apparatus 300 will be described. FIG. 15 is a schematic diagram showing an example of the hardware configuration of the information processing apparatus 300. As shown in FIG. 15, the information processing apparatus 300 includes a communication interface 350, a memory 351, and a processor 352.

The communication interface 350 is used to communicate with other apparatuses. In this example embodiment, the communication interface 350 includes an interface for communicating with the RFID reader 101 and an interface for communicating with the DB server 400.

The memory 351 is composed of, for example, a combination of a volatile memory and a non-volatile memory. The memory 351 is used to store software (a computer program) including at least one instruction executed by the processor 352, data used for various types of processing performed by the information processing apparatus 300, and the like.

The processor 352 loads the software (the computer program) from the memory 351 and executes the loaded software, thereby performing the processing of the communication control unit 301, the flow line specification unit 302, the reading control unit 303, and the data update unit 304 shown in FIG. 5. The processor 352 may be, for example, a microprocessor, a Micro Processor Unit (MPU), or a Central Processing Unit (CPU). The processor 352 may include a plurality of processors.

As described above, the information processing apparatus 300 has functions as a computer. Further, similarly, the DB server 400 includes a processor and a memory, and has functions as a computer. Note that, similarly, the RFID reader 101 may include a processor and a memory, and may have functions as a computer. Therefore, the function of the RFID reader 101 may be implemented by executing the program by the processor. As described above, it will be understood by those skilled in the art that the functions of the reading system 10 can be implemented in various forms by only hardware, only software, or a combination thereof, and the present disclosure is not limited to any of them.

Further, the above-described program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-ROM (Read Only Memory), CD-R, CD-R/W, and semiconductor memories (such as mask ROM, Programmable ROM (PROM), Erasable PROM (EPROM), flash ROM, Random Access Memory (RAM), etc.). Further, the program be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Figure 16:
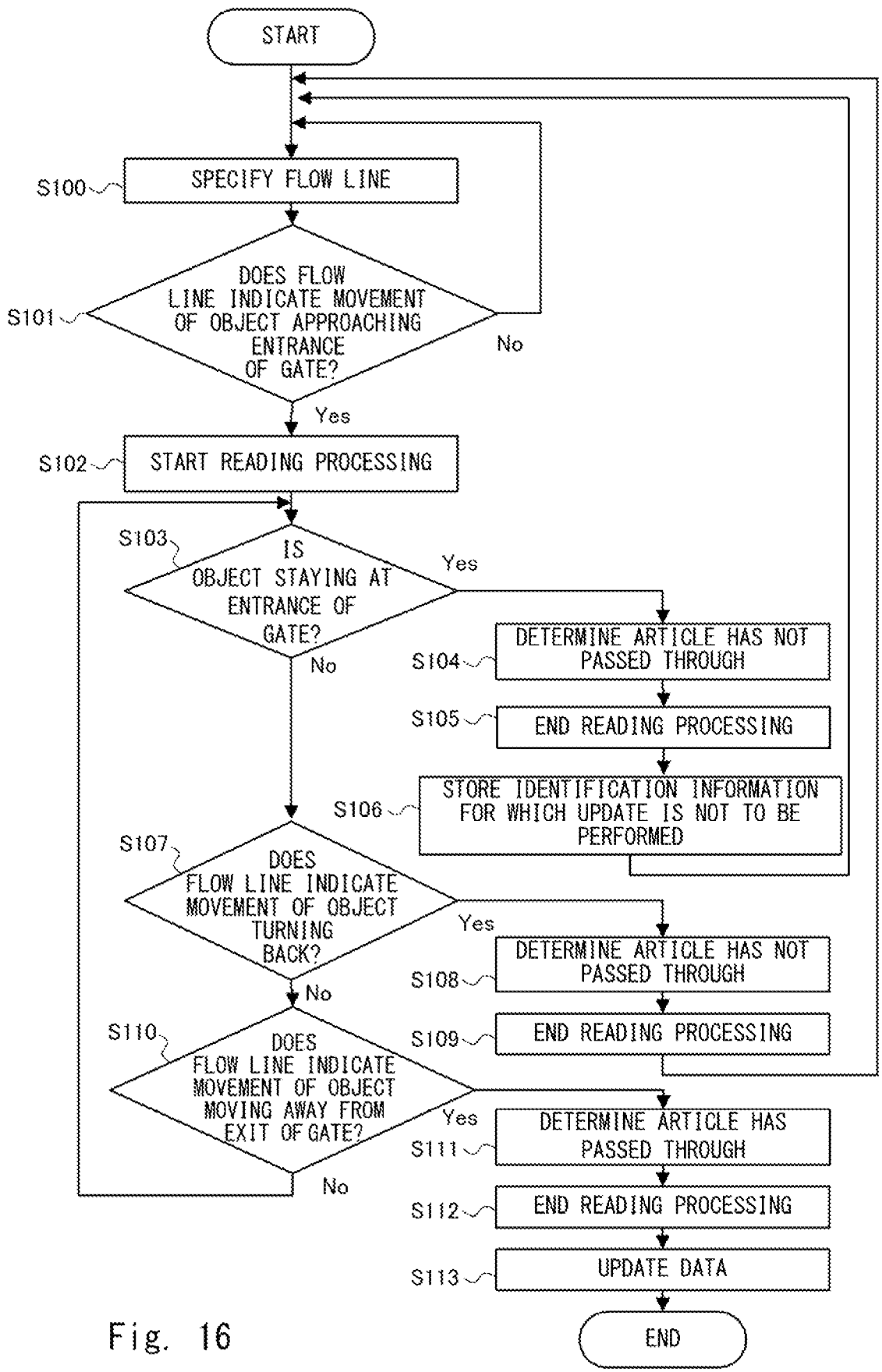
FIG. 16 is a flowchart showing an example of a flow of operations performed by a reading system according to a first example embodiment.

Next, operations of the reading system 10 will be described. FIG. 16 is a flowchart showing an example of a flow of the operations performed by the reading system 10 according to the first example embodiment. The flow of the operations performed by the reading system 10 will be described below with reference to FIG. 16.

In Step S100, the flow line specification unit 302 specifies a flow line of a movement of an object based on results of detection by the sensors 200A and 200B. Note that this process performed by the flow line specification unit 302 is continuously performed even during the process of Step S101 and the subsequent processes.

Next, in Step S101, the reading control unit 303 determines whether or not the flow line specified by the flow line specification unit 302 corresponds to a pattern predetermined as a condition for starting reading processing of the RFID tag 91. That is, the reading control unit 303 determines whether or not the specified flow line indicates a movement of an object approaching the entrance of the gate 50. If the specified flow line does not indicate the movement of an object approaching the entrance of the gate 50, the reading processing is not started and the process returns to Step S100. On the other hand, if the specified flow line indicates the movement of an object approaching the entrance of the gate 50, the process proceeds to Step S102.

In Step S102, the reading control unit 303 determines that the condition for starting the reading processing is satisfied, and performs control so that the reading processing of the RFID tag 91 is started.

Next, in Step S103, the data update unit 304 determines whether or not the flow line after the start of the reading processing indicates that the object is staying near the entrance of the gate 50. If the object is staying at the entrance of the gate 50 for a predetermined period of time or longer, the process proceeds to Step S104. Otherwise, the process proceeds to Step S107.

In Step S104, the data update unit 304 determines that the article 90 specified by the identification information read from the RFID tag 91 by the reading processing started in Step S102 has not passed through the gate 50.

Then, in Step S105, the reading control unit 303 performs control so that the reading processing is ended.

Further, in Step S106, the data update unit 304 stores the identification information read from the RFID tag 91 by the reading processing started in Step S102 as identification information of the article 90 for which conveyance information is not to be updated. After Step S106, the process returns to Step S100.

Meanwhile, in Step S107, the data update unit 304 determines whether or not the flow line after the start of the reading processing indicates a movement of an object turning back from the vicinity of the entrance of the gate 50. If the flow line indicates the movement of an object turning back from the vicinity of the entrance of the gate 50, the process proceeds to Step S108. Otherwise, the process proceeds to Step S110.

In Step S108, the data update unit 304 determines that the article 90 specified by the identification information read from the RFID tag 91 by the reading processing started in Step S102 has not passed through the gate 50.

Then, in Step S109, the reading control unit 303 performs control so that the reading processing is ended. After Step S109, the process returns to Step S100.

Meanwhile, in Step S110, the data update unit 304 determines whether or not the flow line after the start of the reading processing indicates a movement of an object moving away from the vicinity of the exit of the gate 50. If the flow line indicates the movement of an object moving away from the vicinity of the exit of the gate 50, the process proceeds to Step S111. Otherwise, the process returns to Step S103.

In Step S111, the data update unit 304 determines that the article 90 specified by the identification information read from the RFID tag 91 by the reading processing started in Step S102 has passed through the gate 50.

Then, in Step S112, the reading control unit 303 performs control so that the reading processing is ended.

Further, in Step S113, the data update unit 304 updates the conveyance information of the article 90 specified by the read identification information to a value indicating that the article 90 has been conveyed. Note that when the article 90 for which conveyance information is not to be updated is previously stored, the data update unit 304 does not update the conveyance information for this article 90. After Step S113, the process returns to Step S100.

The first example embodiment has been described above. According to the reading system 10, when the conveyance of an article is actually completed, conveyance information can be updated to a value indicating that the article has been conveyed. Therefore, it is possible to appropriately manage the carrying-in or the carrying-out of an article.

Second Example Embodiment

Next, a second example embodiment will be described. This example embodiment differs from the first example embodiment in that conveyance information is updated while taking a moving speed of an object into consideration. When an object is moving at a speed outside the range of the moving speed that is normally assumed even though the detected flow line is appropriate, the object may not be being conveyed appropriately. Therefore, in this example embodiment, it is determined that the article 90 has passed through the gate 50 only when the moving speed satisfies a predetermined proper range thereof.

Figure 17A:
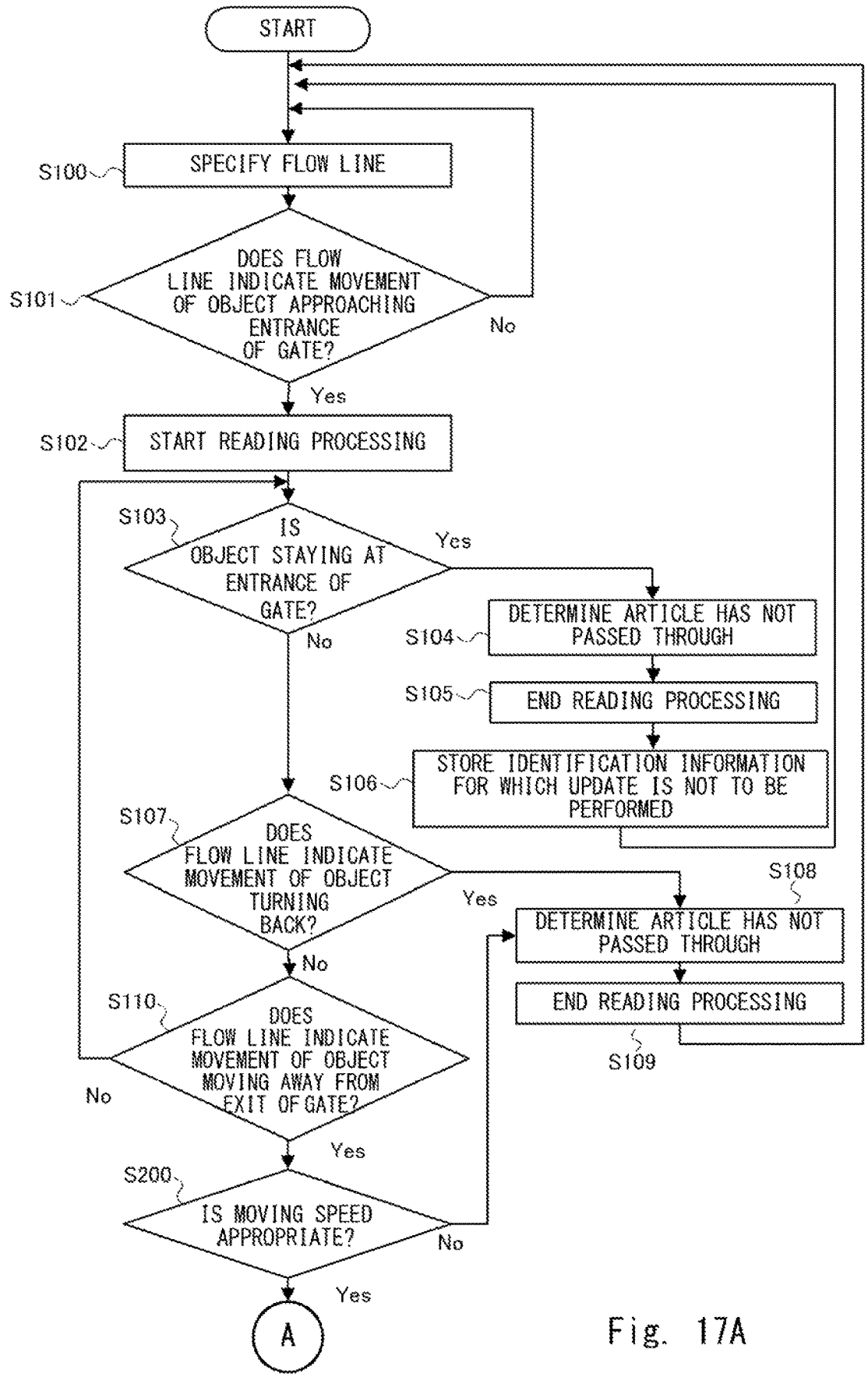
FIGS. 17A and 17B are a flowchart showing an example of a flow of operations performed by a reading system according to a second example embodiment.
Figure 17B:
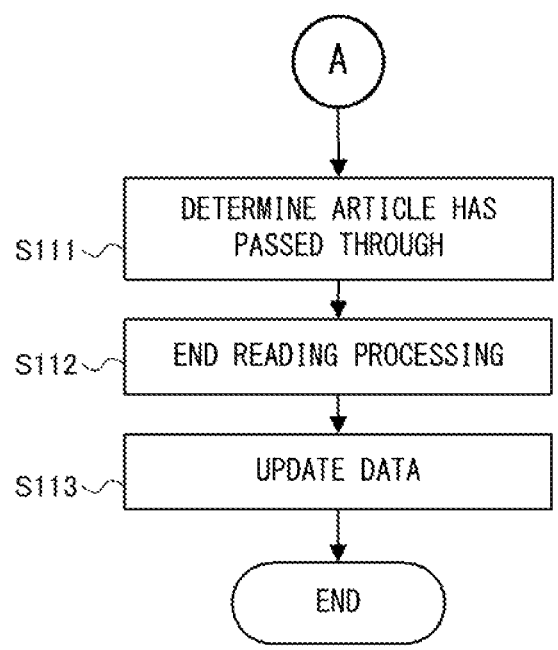

Next, operations of the reading system 10 according to the second example embodiment will be described. FIGS. 17A and 17B are a flowchart showing an example of a flow of the operations performed by the reading system 10 according to the second example embodiment. The flow of the operations performed by the reading system 10 according to the second example embodiment will be described below with reference to FIGS. 17A and 17B. The flowchart shown in FIGS. 17A and 17B differs from the flowchart shown in FIG. 16 in that Step S200 is added. Note that the difference between the flowchart shown in FIGS. 17A and 17B and that shown in FIG. 16 will be described below, and redundant descriptions will be omitted as appropriate.

In the flowchart shown in FIGS. 17A and 17B, the processes from Step S100 to Step S110 are similar to those in the flowchart shown in FIG. 16, the descriptions of these Steps will be omitted.

In this example embodiment, if it is determined in Step S110 that the flow line indicates a movement of an object moving away from the vicinity of the exit of the gate 50, the process proceeds to Step S200.

In Step S200, the data update unit 304 determines whether or not a moving speed of the specified flow line is appropriate. If the moving speed of the specified flow line is appropriate, the process proceeds to Step S111. The process of Step S111 and the subsequent processes are similar to those in the flowchart shown in FIG. 16. On the other hand, if the moving speed of the specified flow line is not appropriate, the process proceeds to Step S108. The process of Step S108 and the subsequent processes are similar to those in the flowchart shown in FIG. 16. Note that if the moving speed of the specified flow line is not appropriate, the data update unit 304 may output information indicating that an abnormality has been detected as an alarm.

The second example embodiment has been described above. According to this example embodiment, conveyance information is updated while taking a moving speed of an object into consideration. Therefore, it is possible to more appropriately manage the carrying-in or the carrying-out of an article.

Further, the whole or part of the example embodiments disclosed above can be described as, but not limited to, the following supplementary notes.

(Supplementary Note 1)

An information processing apparatus comprising:
flow line specification means for specifying a flow line of a movement of an object in a predetermined first area of a gate on an entrance side of the gate; and
reading control means for performing control so that reading processing of an RFID tag near the gate is started when the specified flow line corresponds to a predetermined pattern.

(Supplementary Note 2)

The information processing apparatus according to Supplementary note 1, wherein when the specified flow line indicates a movement of an object approaching a predetermined position near the entrance of the gate, the reading control means performs control so that the reading processing of the RFID tag near the gate is started.

(Supplementary Note 3)

The information processing apparatus according to Supplementary note 1 or 2, further comprising passage determination means for determining whether or not an article specified by identification information read from the RFID tag has passed through the gate, wherein
the flow line specification means further specifies a flow line of a movement of an object in a predetermined second area of the gate on an exit side of the gate, and
when the specified flow line for the movement of the object in the second area corresponds to a predetermined pattern, the passage determination means determines that the article specified by the identification information read from the RFID tag has passed through the gate.

(Supplementary Note 4)

The information processing apparatus according to Supplementary note 3, wherein when the specified flow line for the movement of the object in the second area indicates a movement of an object moving away from a vicinity of the exit of the gate, the passage determination means determines that the article specified by the identification information read from the RFID tag has passed through the gate.

(Supplementary Note 5)

The information processing apparatus according to Supplementary note 3 or 4, wherein when the flow line specified after the start of the reading processing indicates a movement of an object moving away from the vicinity of the entrance of the gate on the entrance side of the gate, the passage determination means determines that the article specified by the identification information read from the RFID tag has not passed through the gate.

(Supplementary Note 6)

The information processing apparatus according to any one of Supplementary notes 3 to 5, wherein when the flow line specified after the start of the reading processing indicates that the object is staying near the entrance of the gate, the passage determination means determines that the article specified by the identification information read from the RFID tag has not passed through the gate.

(Supplementary Note 7)

The information processing apparatus according to Supplementary note 6, wherein in a case in which the passage determination means determines that the article specified by the identification information read from the RFID tag has not passed through the gate since the flow line specified after the start of the reading processing indicates that the object is staying near the entrance of the gate, the passage determination means determines that the article specified by the identification information has not passed through the gate even when the identification information is read from the RFID tag after a next reading processing is started.

(Supplementary Note 8)

A reading system comprising:
a sensor configured to detect an object;
a reading apparatus configured to communicate with an RFID tag and thereby read information stored in the RFID tag; and
an information processing apparatus, wherein
the information processing apparatus comprises:
flow line specification means for specifying a flow line of a movement of an object in a predetermined first area of a gate on an entrance side of the gate based on a result of detection by the sensor; and
reading control means for performing control so that reading processing of an RFID tag near the gate performed by the reading apparatus is started when the specified flow line corresponds to a predetermined pattern.

(Supplementary Note 9)

The reading system according to Supplementary note 8, wherein
the information processing apparatus further comprises passage determination means for determining whether or not an article specified by identification information read from the RFID tag has passed through the gate,
the flow line specification means further specifies a flow line of a movement of an object in a predetermined second area of the gate on an exit side of the gate based on a result of detection by the sensor, and
when the specified flow line for the movement of the object in the second area corresponds to a predetermined pattern, the passage determination means determines that the article specified by the identification information read from the RFID tag has passed through the gate.

(Supplementary Note 10)

The reading system according to Supplementary note 8 or 9, wherein the sensor detects an object by emitting a light beam to each of partial areas obtained by dividing a predetermined area into a lattice shape and receiving a reflected light of the light beam.

(Supplementary Note 11)

An information processing method comprising:
specifying a flow line of a movement of an object in a predetermined first area of a gate on an entrance side of the gate; and
performing control so that reading processing of an RFID tag near the gate is started when the specified flow line corresponds to a predetermined pattern.

(Supplementary Note 12)

A non-transitory computer readable medium storing a program for causing a computer to execute:
a flow line specification step of specifying a flow line of a movement of an object in a predetermined first area of a gate on an entrance side of the gate; and
a reading control step of performing control so that reading processing of an RFID tag near the gate is started when the specified flow line corresponds to a predetermined pattern.

Although the present invention has been described with reference to the example embodiments, the present invention is not limited to the above-described example embodiments. Various changes that may be understood by those skilled in the art may be made to the configurations and details of the present invention within the scope of the invention.

This application is based upon and claims the benefit of priority from Japanese patent application No. 2019-151546, filed on Aug. 21, 2019, the disclosure of which is incorporated herein in its entirety by reference.

REFERENCE SIGNS LIST

1 INFORMATION PROCESSING APPARATUS
2 FLOW LINE SPECIFICATION UNIT
3 READING CONTROL UNIT
10 READING SYSTEM
50 GATE
51A DETECTION AREA
51B DETECTION AREA
90 ARTICLE
91 RFID TAG
100 READING APPARATUS
101 RFID READER
102 ANTENNA
200A SENSOR
200B SENSOR
201 LIGHT BEAM
300 INFORMATION PROCESSING APPARATUS
301 COMMUNICATION CONTROL UNIT
302 FLOW LINE SPECIFICATION UNIT
303 READING CONTROL UNIT
304 DATA UPDATE UNIT
350 COMMUNICATION INTERFACE
351 MEMORY
352 PROCESSOR
400 DB SERVER
510A PARTIAL AREA
510B PARTIAL AREA

What is claimed is:

1. An information processing apparatus comprising:
at least one memory storing program instructions; and
at least one processor configured to execute the instructions stored in the memory to:
specify a first flow line of a first movement of an object in a predetermined first area of a gate on an entrance side of the gate;
specify a second flow line of a second movement of the object in a predetermined second area of the gate on an exit side of the gate;
perform control so that reading processing of a radio frequency identifier (RFID) tag near the gate is started when the specified first flow line corresponds to a first predetermined pattern;
when the specified second flow line for the movement of the object in the second area corresponds to a second predetermined pattern, determine that an article specified by identification information read from the RFID tag has passed through the gate;
when the first flow line specified after the start of the reading processing indicates that the object is staying near the entrance of the gate, determine that the article specified by the identification information read from the RFID tag has not passed through the gate; and
in a case in which the processor determines that the article specified by the identification information read from the RFID tag has not passed through the gate since the first flow line specified after the start of the reading processing indicates that the object is staying near the entrance of the gate, determine that the article specified by the identification information has not passed through the gate even when the identification information is read from the RFID tag after a next reading processing is started.

2. The information processing apparatus according to claim 1, wherein the processor is further configured to execute the instructions to, when the specified first flow line indicates a movement of an object approaching a predetermined position near the entrance of the gate, perform control so that the reading processing of the RFID tag near the gate is started.

3. The information processing apparatus according to claim 1, wherein the processor is further configured to execute the instructions to, when the specified second flow line for the movement of the object in the second area indicates a movement of an object moving away from a vicinity of the exit of the gate, determine that the article specified by the identification information read from the RFID tag has passed through the gate.

4. The information processing apparatus according to claim 1, wherein the processor is further configured to execute the instructions to, when the first flow line specified after the start of the reading processing indicates a movement of an object moving away from a vicinity of the entrance of the gate on the entrance side of the gate, determine that the article specified by the identification information read from the RFID tag has not passed through the gate.

5. An information processing method comprising:
specifying a first flow line of a first movement of an object in a predetermined first area of a gate on an entrance side of the gate;
specifying a second flow line of a second movement of the object in a predetermined second area of the gate on an exit side of the gate;

performing control so that reading processing of a radio frequency identifier (RFID) tag near the gate is started when the specified first flow line corresponds to a first predetermined pattern;

when the specified second flow line for the movement of the object in the second area corresponds to a second predetermined pattern, determining that an article specified by an identification information read from the RFID tag has passed through the gate;

when the first flow line specified after the start of the reading processing indicates that the object is staying near the entrance of the gate, determining that the article specified by the identification information read from the RFID tag has not passed through the gate; and in a case in which the article specified by the identification information read from the RFID tag is determined to have not passed through the gate since the first flow line specified after the start of the reading processing indicates that the object is staying near the entrance of the gate, determining that the article specified by the identification information has not passed through the gate even when the identification information is read from the RFID tag after a next reading processing is started.

6. A non-transitory computer readable medium storing a program for causing a computer to execute:

a first flow line specification step of specifying a first flow line of a first movement of an object in a predetermined first area of a gate on an entrance side of the gate;

a second flow line specification step of specifying a second flow line of a second movement of the object in a predetermined second area of the gate on an exit side of the gate;

a reading control step of performing control so that reading processing of a radio frequency identifier (RFID) tag near the gate is started when the specified first flow line corresponds to a first predetermined pattern, a first passage determination step of, when the specified second flow line for the movement of the object in the second area corresponds to a second predetermined pattern, determining that an article specified by an identification information read from the RFID tag has passed through the gate;

a second passage determination step of, when the first flow line specified after the start of the reading processing indicates that the object is staying near the entrance of the gate, determining that the article specified by the identification information read from the RFID tag has not passed through the gate; and a third passage determination step of, in a case in which the article specified by the identification information read from the RFID tag is determined to have not passed through the gate since the first flow line specified after the start of the reading processing indicates that the object is staying near the entrance of the gate, determining that the article specified by the identification information has not passed through the gate even when the identification information is read from the RFID tag after a next reading processing is started.

\* \* \* \* \*